S. S. MORTON.
Fertilizer and Grain-Distributor.
No. 207,062. Patented Aug. 13, 1878.
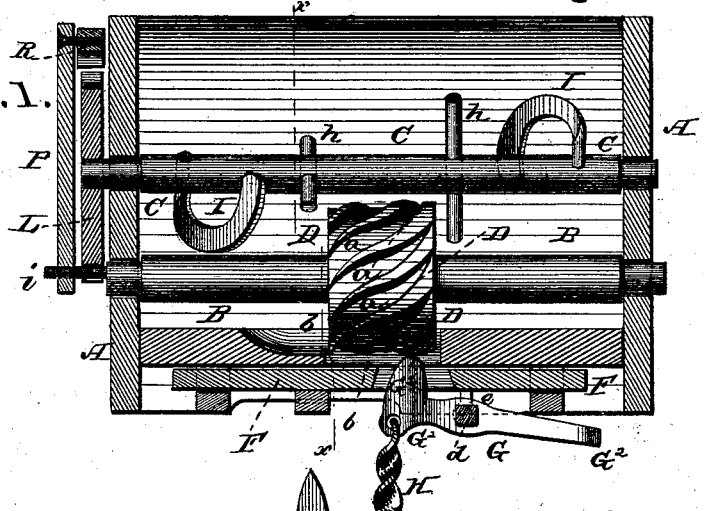
Fig. 1.
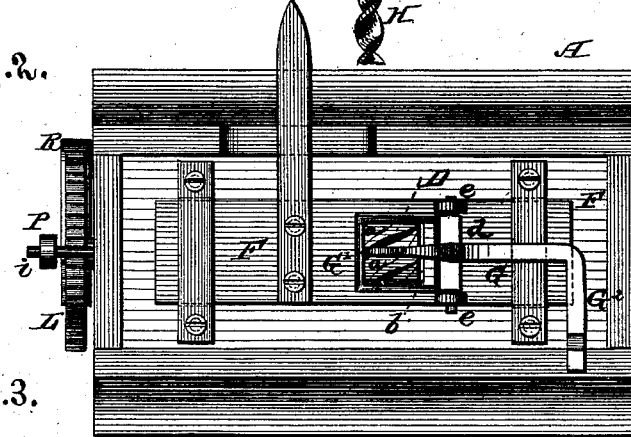
Fig. 2.
Fig. 3. Fig. 4.
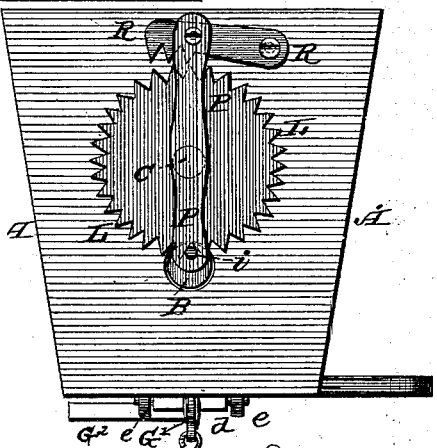
Witnesses: Inventor:
Samuel S. Morton
Per C. H. Watson & Co. Attorneys.

UNITED STATES PATENT OFFICE.

SAMUEL S. MORTON, OF YORK, PENNSYLVANIA, ASSIGNOR OF ONE-HALF HIS RIGHT TO HUGH W. McCALL, OF SAME PLACE.

IMPROVEMENT IN FERTILIZER AND GRAIN-DISTRIBUTER.

Specification forming part of Letters Patent No. 207,062, dated August 13, 1878; application filed July 23, 1878.

*To all whom it may concern:*

Be it known that I, SAMUEL S. MORTON, of York, in the county of York and State of Pennsylvania, have invented certain new and useful Improvements in Fertilizer and Grain-Distributer; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention consists in the construction and arrangement of a grain and fertilizer distributer, as will be hereinafter more fully set forth.

In the annexed drawing, to which reference is had, and which fully illustrates my invention, Figure 1 is a central vertical section of my invention. Fig. 2 is a bottom view of the same. Fig. 3 is a transverse vertical section on $x\,x$, Fig. 1. Fig. 4 is an end view of the machine.

A represents the hopper, in which is placed the grain or fertilizer to be distributed. In this hopper are located two shafts, B and C, one above the other, and both having their bearings in the ends of the hopper, the lower shaft, B, projecting sufficiently far beyond one end to receive such devices as may be used for rotating the same, and the upper shaft, C, receiving an intermittent rotary motion from the lower shaft by devices that will be hereinafter described.

In the center on the lower shaft, B, is secured the distributing-roller D, which is formed on its circumference with a series of diagonal or spiral grooves, $a\,a$, and these grooves are made tapering, so as to be wider at the rear than at the front end.

To the bottom of the hopper A, in front of the roller D, is secured an inclined guard or cut-off, E, which acts as a shear to cut or divide any lumps that may be in the fertilizer and brought forward in the grooves of the roller, and also guides to one side any stones or hard lumps, so as not to clog the machine.

The roller D works directly over an opening, $b$, in the bottom of the hopper, and below said bottom, in suitable guides, is placed a slide, F, having a corresponding opening, and by means of which the opening $b$ may be regulated, so as to regulate the amount sown, or cut it off altogether.

In hangers $e\,e$ on the under side of the slide F is hung a rock-shaft, $d$, to which is attached a lever, G. The inner end of this lever is formed with an upwardly-projecting tooth or finger, $G^1$, and the outer end of the lever is formed or provided with a weighted arm, $G^2$, which holds the finger $G^1$ in the grooves $a$ on the roller D, so as to clear the material from said grooves and allow the same to drop down.

To the inner end of the lever G is attached a chain, H, composed of links made of twisted metal pieces, as shown, which chain is to hang down through the conductor which conveys the fertilizer from the hopper to the ground.

During the operation of the machine the tooth or finger $G^1$ will pass from one inclined groove in the roller D to another, and as it passes over the ridges separating such grooves and then drops into the next one, the lever G obtains a rocking motion, which causes the chain H to be moved up and down, and thereby clear the conductor so that the same will not be clogged or choked up.

In the center of the shaft C are secured straight teeth or arms $h\,h$, which work on the sides of the roller D for the purpose of agitating the fertilizer and keeping stones and hard lumps away from the roller. On each side of these teeth in the shaft C is secured a curved wing, I, and these wings are set inclined in such a manner as to act like a screw and feed the fertilizer from both sides toward the roller.

On one end of the shaft C, outside of the hopper, is secured a toothed wheel, L, which is operated intermittently by a crank, $i$, on the end of the shaft B. On this crank is placed a pitman, P, which connects with a pawl, R, pivoted to the end of the hopper and taking into the wheel L. For each revolution of the shaft B the crank $i$ takes into and moves the wheel L the distance of one of its teeth. As the crank turns to engage with the wheel the pitman P raises the pawl R, and as soon as the crank leaves the wheel the pawl is lowered and engages with the wheel, so as to prevent any movement of the same and hold it in position for the next time the crank is to engage with it.

By changing the crank $i$ and substituting a wheel with more or less teeth the movement of the shaft C may be increased or diminished at pleasure.

Having thus fully described my invention, what I claim as new, and desire to secure by Letters Patent, is—

1. The combination of the roller D, having diagonal or spiral tapering grooves $a$ and the inclined shear-guide E, for the purposes herein set forth.

2. In combination with the roller D, having grooves $a$, as described, the slide F, rocking lever G, with clearer $G^1$ and weighted arm $G^2$, and the twist-chain H, substantially as and for the purposes herein set forth.

3. In combination with the distributing-roller D, the intermittently-rotating shaft C, having straight teeth $h$ operating close to the side of the roller, and inclined curved wings I, arranged to draw the seed or fertilizer from both ends toward the roller, substantially as and for the purposes herein set forth.

4. The combination of the shaft B with crank $i$, the shaft C with toothed wheel L, the pitman P, and pawl R, substantially as and for the purposes herein set forth.

In testimony that I claim the foregoing as my own I have hereto affixed my signature in presence of two witnesses.

SAMUEL S. MORTON.

Witnesses:
WM. B. UPPERMAN,
FRANK GALT.